(12) United States Patent
Nalam

(10) Patent No.: US 8,090,825 B1
(45) Date of Patent: *Jan. 3, 2012

(54) SYSTEM AND METHOD FOR MULTIBEACONING

(75) Inventor: Naveen Nalam, San Francisco, CA (US)

(73) Assignee: Quantcast Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/762,481

(22) Filed: Apr. 19, 2010

Related U.S. Application Data

(63) Continuation of application No. 12/163,749, filed on Jun. 27, 2008, now Pat. No. 7,752,261.

(51) Int. Cl.
*G06F 15/173* (2006.01)

(52) U.S. Cl. ........ 709/224; 709/203; 709/216; 709/217; 709/226; 709/244

(58) Field of Classification Search .................. 709/203, 709/216, 217, 223, 244, 226, 228, 224
See application file for complete search history.

(56) References Cited

U.S. PATENT DOCUMENTS

| | | | |
|---|---|---|---|
| 6,073,241 A | 6/2000 | Rosenberg et al. | |
| 6,314,492 B1* | 11/2001 | Allen et al. | 711/135 |
| 6,336,135 B1 | 1/2002 | Niblett et al. | |
| 6,438,592 B1 | 8/2002 | Killian | |
| 6,976,077 B1 | 12/2005 | Lehew et al. | |
| 6,993,137 B2 | 1/2006 | Fransdonk | |
| 6,993,590 B1* | 1/2006 | Gauthier et al. | 709/231 |
| 7,177,901 B1 | 2/2007 | Dutta | |
| 7,216,149 B1* | 5/2007 | Briscoe et al. | 709/217 |
| 7,240,365 B2 | 7/2007 | de Jong et al. | |
| 7,257,546 B2* | 8/2007 | Ebrahimi et al. | 705/14.73 |
| 7,606,897 B2* | 10/2009 | Izrailevsky et al. | 709/224 |
| 7,752,261 B1* | 7/2010 | Nalam | 709/203 |
| 7,958,191 B1* | 6/2011 | Nalam | 709/203 |
| 8,041,303 B2* | 10/2011 | Jiang et al. | 455/67.11 |
| 2002/0152461 A1 | 10/2002 | Istvan | |
| 2003/0046159 A1* | 3/2003 | Ebrahimi et al. | 705/14 |
| 2005/0216844 A1* | 9/2005 | Error et al. | 715/745 |
| 2005/0223093 A1 | 10/2005 | Hanson et al. | |
| 2006/0265495 A1 | 11/2006 | Butler et al. | |
| 2007/0260512 A1* | 11/2007 | Sattley et al. | 705/14 |

(Continued)

OTHER PUBLICATIONS

PCT International Search Report, PCT/US2008/070550, Jan. 19, 2009, 2 pages.

(Continued)

*Primary Examiner* — Michael Won
(74) *Attorney, Agent, or Firm* — Fenwick & West LLP

(57) ABSTRACT

A method and system for triggering multiple client requests, including: providing directions for obtaining multibeacon instructions, in response to a content request from the client device, providing the multibeacon instructions in response to a request from the client device, with the request for multibeacon instructions submitted by the client device based on the directions, receiving an initial image request at the multibeacon management system from the client device wherein the initial image request is submitted by the client device upon execution of the multibeacon instructions, and, composing and sending a beacon from the multibeacon management system to the client device in response to the initial image request causing the configuration of a storage device at the client device for storing the beacon, wherein the properties of the beacon are configured to trigger the multibeacon instructions to instruct the client device to submit additional image requests to the multibeacon management system.

21 Claims, 3 Drawing Sheets

U.S. PATENT DOCUMENTS

| | | |
|---|---|---|
| 2008/0004958 A1* | 1/2008 | Ralph et al. ............... 705/14 |
| 2008/0086368 A1* | 4/2008 | Bauman et al. ............ 705/14 |
| 2008/0092058 A1 | 4/2008 | Afergan et al. |
| 2008/0126567 A1 | 5/2008 | Wilson |
| 2008/0146160 A1* | 6/2008 | Jiang et al. ............ 455/67.11 |
| 2008/0147480 A1* | 6/2008 | Sarma et al. ............. 705/10 |
| 2008/0154933 A1 | 6/2008 | Galvin et al. |
| 2008/0270412 A1* | 10/2008 | Udayasankar et al. ...... 707/10 |
| 2008/0306830 A1 | 12/2008 | Lasa et al. |
| 2009/0024748 A1 | 1/2009 | Goldspink et al. |
| 2009/0064173 A1 | 3/2009 | Goldspink et al. |
| 2009/0172091 A1 | 7/2009 | Hamel |

OTHER PUBLICATIONS

PCT Written Opinion, PCT Application No. PCT/US2008/070550, Jan. 19, 2009, 4 pages.

* cited by examiner

Content and directions for obtaining mult-beacon instructions are provided to a client device from a networked content provider over a network in response to a content request from the client device (Step 300).

The directions are used to retrieve multibeacon instructions over a network from a multibeacon management system and the instructions are executed at the client device, resulting in the submission of an initial image request over a network to the multibeacon management system (Step 320).

A beacon is composed and sent from the multibeacon management system to the client in response to the initial image request causing the configuration of digital storage at the client device for storing a digital representation of the beacon, with the properties of the beacon configured to trigger the multibeacon instructions to instruct the client to submit one or more additional image requests to the multibeacon management system (Step 340).

Optionally, the method continues when an additional image request is received at the multibeacon management system and redirected to a third party system (Step 360).

Figure 3

SYSTEM AND METHOD FOR MULTIBEACONING

CROSS-REFERENCE TO RELATED APPLICATIONS

The present application is a Continuation application of U.S. patent application Ser. No. 12/163,749, filed on Jun. 27, 2008, entitled "System and Method for Multibeaconing".

FIELD OF INVENTION

The invention relates to methods and systems for beaconing and specifically for triggering additional client requests to third party systems.

BACKGROUND OF INVENTION

Visitor interaction with networked resources such as web sites or networked e-mail is often tracked on behalf of the content servers by third party servers using beacons. Beacons are also known as tracking pixels or clear GIFs (Graphics Interchange Format). When a client device requests content from a content server, the content server directs the client device to submit an image request which includes a request for the beacon from a third party server. The image request may provide the third party server with client information and it can enable the third party server to receive, set or re-set client tracking identifiers such as third party cookies. In response to the image request, the third party server may also send a usually small (usually one pixel wide and one pixel high) and often transparent or inconspicuous beacon to the client device for display on an output device associated with the client device.

Third party servers may be involved in delivering a variety of services such as the collection of web metrics or the delivery of advertising. In some cases, it would be useful if a single image request from a client device could be redirected to multiple third party servers, thereby enabling the other third party servers to receive, set and/or re-set their own third party cookies associated with a client device. In some cases, this can be accomplished by embedding at least one beacon per targeted third party server in the content provided by a content server. This solution requires each content server to control beaconing along with their content, which may be challenging to manage. Furthermore, requiring the management of multiple beacons by the content provider can be a barrier to adoption for new services and new service paradigms.

In other cases, directing image requests to multiple third part servers may be accomplished by directing the client device to download a beaconing script, such as a JavaScript™ script, when content is provided by a content provider. For example, the beaconing script may include instructions to send image requests to each third party server in a list of hard coded third party servers. This type of solution does not easily enable dynamic or selective direction of image requests to third party servers; furthermore, changes to the list of hard coded third party servers can be cumbersome to manage.

What is needed is a system and method for centrally managing and administering beaconing to multiple third party servers which is simple to adopt.

SUMMARY OF INVENTION

A method and system for triggering multiple client requests includes providing directions for obtaining multibeacon instructions, from a content provider to a client device, over a network, in response to a content request from the client device. According to the current invention, the multibeacon instructions can be provided over the network from the multibeacon management system to the client device in response to a request for multibeacon instructions from the client device, with the request for multibeacon instructions submitted by the client device based on the directions. An initial image request is received at the multibeacon management server from the client device over the network wherein the initial image request is submitted by the client device upon execution of the multibeacon instructions. The multibeacon management system composes and sends a beacon to the client device in response to the initial image request, causing the configuration of a storage device at the client device for storing a representation of the beacon, wherein the properties of the beacon are configured to trigger the multibeacon instructions to instruct the client device to submit one or more additional image requests to the multibeacon management system. Examples of properties include, but are not limited to, the height, width, area, perimeter and/or spatial dimensions of the beacon, the storage size, color values and/or color intensity of the beacon.

Optionally, additional image requests are received at the multibeacon management server from the client device over the network and can be redirected to third party systems, thereby enabling the third party systems to read, set and/or re-set third party client identifiers such as, but not limited to, third party cookies.

Optionally, the multibeacon management server can be configured to select third party systems for redirection based on one or more profiles, parameters, properties or categories such as, but not limited to, categorization of the client device, the content provider, the content, demographic data, inferred demographic data, profiles associated with the client device, geographic data, time, date, browsing history, purchasing history and/or data related to past redirections.

BRIEF DESCRIPTION OF DRAWINGS

FIG. 3 illustrates a method flow according to an example of the current invention.

Appendix A is an example of directions for obtaining multibeacon instructions.

Appendix B is an example of pseudocode for multibeacon instructions.

DETAILED DESCRIPTION OF THE INVENTION

Figure 1:
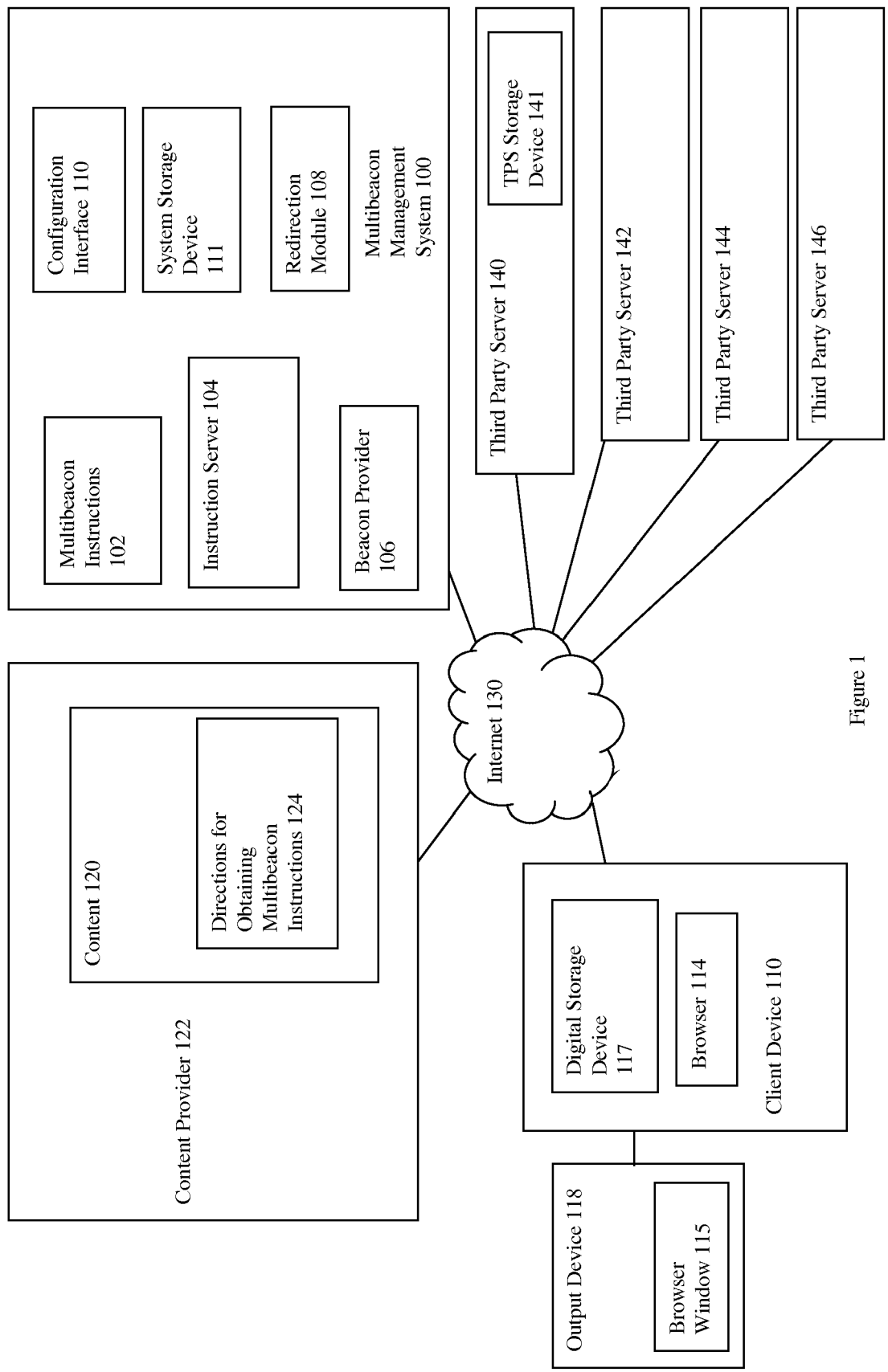
FIG. 1 illustrates a multibeacon management system in a first embodiment of the current invention.

FIG. 1 illustrates a multibeacon management system 100 in a first embodiment of the current invention. A multibeacon management system 100 triggers the controlled generation of additional image requests from a client device 110, such as a personal computer, to the multibeacon management system 100, with the number of additional image requests based on the properties of a beacon configured and sent by the multibeacon management system 100. Examples of properties include, but are not limited to, the height, width, area, perimeter and/or spatial dimensions of the beacon, the storage size, color values and/or color intensity of the beacon. The multibeacon management system 100 can subsequently manage the redirection of those additional image requests to targeted third party systems such as third party servers 140, 142, 144 and 146. The selection of targeted third party systems can be configured at the multibeacon management system 100, enabling centralized management of third party beaconing.

Figure 2:
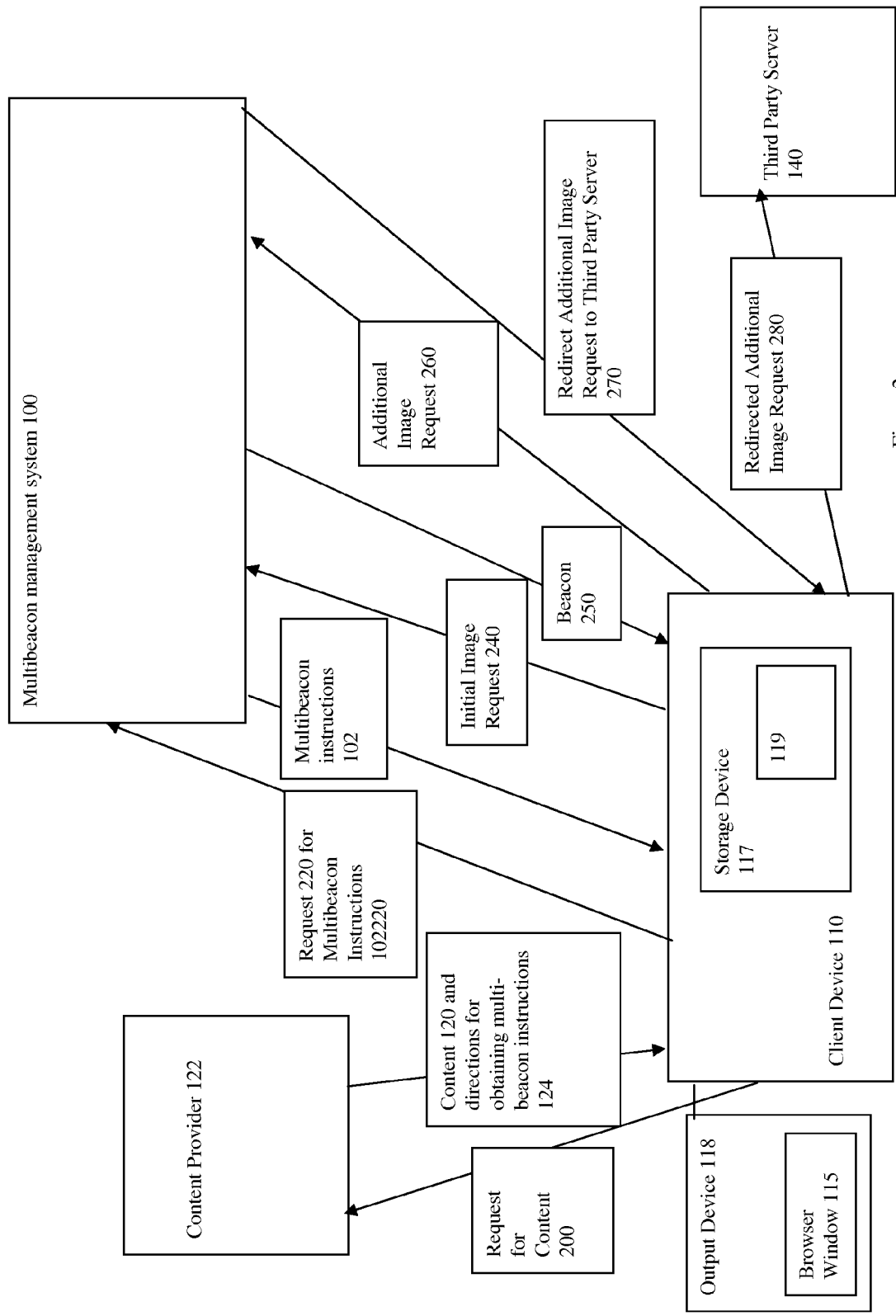
FIG. 2 illustrates an example flow of network traffic associated with a first embodiment of the current invention.

FIG. 2 illustrates an example flow of network traffic associated with a first embodiment 100 of the current invention. According to the current invention, a client device 110, such as a personal computer, can submit a request 200 for content 120 from a content provider 122 over a network 130, such as the Internet. The content provider 122 can provide the requested content 120 over a network 130 for presentation at an output device 118 associated with the client device 110 and include directions 124 for obtaining multibeacon instructions 102. The directions 124 can direct the client device 110 to submit a request 220 for multibeacon instructions 102 to a multibeacon management system 100.

The multibeacon instructions 102 can be provided to the client device 110 over the network 130. This can enable the multibeacon management system 100 to optionally read, set and/or re-set client tracking identifiers such as, but not limited to, third party cookies associated with the multibeacon management system 100. Client tracking identifiers, the content 120 and/or the multibeacon instructions 102 can be stored in one or more storage devices. A storage device can be part of the client device and/or accessible by the client device over a permanent or intermittent connection such as a network.

The multibeacon instructions 102 can be executed at the client device 110, resulting in the submission of an initial image request 240 to the multibeacon management system 100 over a network 130. This can enable the multibeacon management system 100 to optionally read, set and/or reset client tracking identifiers such as, but not limited to, third party cookies associated with the multibeacon management system 100. For example, providing the opportunity to read, set and/or reset client tracking identifiers at this stage can be useful for cases when a cached copy of multibeacon instructions 102 are used. In response to the initial image request 240, the multibeacon management server sends a beacon 250 to the client device 110, causing the configuration of a storage device 117, such as storage registers, at the client device 110 for storing a representation 119 of the beacon 250. Examples of storage devices include, but are not limited to, volatile memory, non-volatile memory, storage registers, Random Access Memory (RAM), flash memory, on-board memory, hard disk storage devices and combinations thereof. In this example, the beacon 250 includes a small, transparent image which can be presented as an element of a web page in a browser window 115 on an output device 118 such as a computer monitor. The beacon 250 can be small and inconspicuous on an output device such as a computer monitor. In some cases, the beacon may not be displayed by the output device or the beacon can be invisible.

Multibeacon instructions 102 can further include directions for handling beacons such as beacon 250 received at the client device 110 from the multibeacon management system 100. For example, in response to the receipt of the beacon 250 from the multibeacon management system 100, multibeacon instructions 102 can direct the client device 110 to submit a number of additional image requests 260 to the multibeacon management system 100 over the network 130. The multibeacon instructions 102 can enable the client device 110 to determine the number of additional image requests 260 to send based at least in part on the properties of the beacon 250 received by the client device 110 from the multibeacon management system 100. Examples of properties include, but are not limited to, the height, width, area, perimeter and/or spatial dimensions of the beacon, the storage size, color values and/or color intensity of the beacon. In response to the receipt of a beacon 250, the client device 110 can submit additional image requests 260 to the multibeacon management system 100 which can be redirected to third party systems such as targeted third party servers 140, 142, 144 and 146 by the multibeacon management system. In this example, the additional image request 260 is redirected to a targeted third party server 140 through the client device 110, enabling the targeted third party servers such as third party server 140 to optionally read, set and/or re-set client tracking identifiers such as, but not limited to, third party cookies on the client device 110. In this example, the number of additional image requests 260 may be configured to equal the number of third party systems targeted for redirection.

For the first embodiment of the current invention depicted in FIGS. 1 and 2, the client device 110 is a personal computer running a web browser 114; the web browser 114 presents a browser window 115 on an output device 118, such as a personal computer monitor, associated with the client device 110. In this example, the content 120 and the beacon 250 are both presented on the same output device 118. However, it is understood that in other embodiments of the current invention, the output device used to present the beacon 250 may or may not be the same output device used to present the content 120. In some cases, one or more output devices can be used to present the content 120 which may or may not include the output device used to present the beacon. Examples of output devices 118 can include, but are not limited to, output devices external to the client device, output devices integrated with the client device, multimedia systems, video output devices, televisions, monitors, displays, audio output devices, speakers, headphones or any combination thereof. In some cases, the output devices can be integrated with the client device; for example, according to the current invention, the client device can be a cell phone and the integrated cell phone screen can be an output device. In some cases, the output device can be external to the client device, such as a projection screen coupled to a client device, such as a personal computer, over a persistent or intermittent connection such as a network or cable.

For the first embodiment of the current invention depicted in FIGS. 1 and 2, the network 130 is the Internet. However the network 130 can be a phone network, an internet, a cable network, an intranet, a local area network (LAN), the Internet or any combination thereof. According to the current invention, a client device may be a wired or wireless device used for persistent or intermittent access to the network 130. Examples of client devices include, but are not limited to, a personal computer, a portable computer, a PDA (Personal Digital Assistant), a DVR (digital video recorder), a PVR (personal video recorder) and/or a cell phone.

In the first embodiment of the current invention depicted in FIGS. 1 and 2, the multibeacon management system 100 includes a server coupled to a network 130, such as the Internet. However, it is understood that a multibeacon management system can be distributed across multiple servers, systems, locations and/or networks. Furthermore, a multibeacon management system is coupled to the network 130 which can include one or more persistent or intermittent networks such as a phone network, an internet, a cable network, an intranet, a local area network (LAN), the Internet or any combination thereof.

The client device 110 depicted in FIGS. 1 and 2 uses a web browser 114 to request content 120 from the content provider 122 over the network 130. In this example, an end-user operates a personal computer running a web browser 114 to request a web page from a web site over the Internet. However, in other examples according to the current invention, other viewers or access software may operate on the client device for accessing or presenting networked resources. Furthermore, the content requested by the client device can include, but is not limited to, web pages, text, images, video content, audio content, multimedia presentations or any combination thereof, which can be presented to one or more end-users using one or more output devices and can be stored in one or more storage devices.

According to the current invention, the content provider 122 provides the requested content 120 over a network 130 and directs the client device 110 to download multibeacon instructions 102 from a multibeacon management system 100. For the example illustrated in FIGS. 1 and 2, the content provider 122 is a web site which provides content 120 in the form of a web page. A content provider 122 such as a web site may direct a client device 110 such as a personal computer, to download multibeacon instructions 102 from a multibeacon management system 100 by embedding an HTML instruction in the web page which includes the file location described using a URL (Universal Resource Locator). Appendix A is an example of directions 124 for obtaining multibeacon instructions 102. These directions 124 can be embedded in a web site to direct a client device 110 to download multibeacon instructions 102 from a multibeacon management system 100.

It is an advantage of some examples of the current invention that the content provider can simply and easily integrate their current operations with a multibeacon management system by incorporating a small snippet of code into their current content. Although there may be opportunities for a content provider to interact with and/or integrate with a multibeacon management system, no other integration activities are required by the content provider in order to operate with this embodiment of the current invention.

It is understood that in some cases, the current invention can be configured to use the same set of multibeacon instructions for all client devices. However, in other examples according to the current invention, the multibeacon instructions can be customized. For example, in some cases, the multibeacon instructions can be customized to address the hardware, software and/or firmware configuration of the client device. In other examples, the multibeacon instructions can be customized based on one or more parameters such as, but not limited to, the geographical location of the client device and the hardware, software or firmware configuration of the client device.

In some cases, the requested content 120 may not be provided by the content provider 122 when requested by the client device 110. For example, in some cases, the content 120 may be retrieved from a cache or storage device on the client device 110 or from a cache system available on a local network or intranet. Similarly, the multibeacon instructions 102 may not be freshly downloaded from the multibeacon management system 100. For example, in some cases, the multibeacon instructions 102 may be retrieved from a cache or storage device on the client device 110 or from a cache system available on a local network or intranet. Appendix B is an example of pseudocode for multibeacon instructions 102. Multibeacon instructions can be implemented using a variety of techniques. For example, multibeacon instructions 102 can include, but are not limited to, JavaScript™, HTML instructions, ActionScript™ scripts or any combination thereof.

The multibeacon instructions 102 can provide the client device 110 with information enabling the client device 110 to determine the number of additional image requests 260 to send based at least in part on the properties of the beacon 250 received by the client device 110 from the multibeacon management system 100. Examples of properties include, but are not limited to, storage size and/or spatial dimensions of the beacon. The properties of the beacon 250 can be configured in a manner that is consistent with the multibeacon instructions 102 and the targeted number of additional image requests 260. For operation of the current invention, it is important to keep the logic embedded in the multibeacon instructions 102 consistent with the rules that the multibeacon management system 100 uses to configure the beacon 250. For example, if the logic embedded in the multibeacon instructions 102 directs the client device 110 to submit one additional image request 260 per pixel width of the beacon 250, then the multibeacon management system 100 can construct a beacon 250 using a rule that directs it to create a beacon 250 with a pixel width equal to the desired number of additional image requests 260.

According to the current invention, the multibeacon management system 100 can construct a beacon 250 with properties based on the targeted number of additional image requests 260. In one embodiment according to the current invention, the targeted number of additional image requests 260 can be configured on a per multibeacon management system 100 basis, with the targeted number of additional image requests 260 set to be the same for all client device interactions; a single list of third party systems can be maintained per multibeacon management system. The multibeacon management system can track the redirection of additional image requests to ensure that each additional image request received from a particular client device is redirected to a different third party system on the list.

According to various embodiments of the current invention, the targeted number of additional image requests and/or the list of third party systems can be configured per client device or per group of client devices. For example, an optional configuration interface 110 can be used to configure the multibeacon management system 100. In some cases, the targeted number of additional image requests, the selection of the list of third party systems and/or the prioritization of the third party systems on the list can be determined when an initial image request is received by selecting the targeted number of additional image requests, the list of third party servers and/or the prioritization of the third party systems on the list based on the identity of the client device or the categorization or grouping of the client device. In other examples according to the current invention, the targeted number of additional image requests, the list of third party systems and/or the prioritization of the third party systems on the list can be configured per client tracking identifier value or per set of client tracking identifier values.

According to various embodiments of the current invention, the targeted number of additional image requests, the list of third party systems and/or the prioritization of the third party systems on the list can be based on one or more redirection parameters such as, but not limited to, the properties of the client device, the actual or inferred browsing history associated with the client device or end-user, the actual or inferred purchasing history associated with the client device or end-user, the actual or inferred history of activity or transactions associated with the client device or end-user, actual or inferred demographic data, the time of day, the date, the properties of the initial image request, the identity of the content provider, the values of client tracking identifiers, the service level associated with the original content provider, the geographic location of the client device or end-user, or any combination thereof. For example, a configuration interface can be used to establish configurations based on known, estimated or inferred redirection parameter values or ranges. For example, one redirection configuration may be used to select a list of third party servers for redirection based on identifying client devices associated with male end-users between the ages of 18 and 35 in the city of San Francisco between the hours of 8-10 PM who have previously visited a particular set of websites.

According to some embodiments of the current invention, the selection of targeted third party servers and/or the prioritization of the targeted third party servers can be managed on the multibeacon management system 100. For example lists or databases can be maintained on the multibeacon management server and used to select targeted third party servers for redirection. However, in some cases, the targeted third party servers can be provided by an external system, accessible by the multibeacon management system. For example, in some cases, an external system may maintain a database of third party systems and queries may be submitted to internal and/or external databases to retrieve a complete or partial list of third party systems. IN some cases, the complete or partial lists can be prioritized.

According to the current invention, the client device 110 can submit the additional image requests to the multibeacon management system 100, which are redirected to third party systems such as targeted third party servers 140, 142, 144 and 146. For example, in some cases, the redirection may be accomplished by ending an HTTP command such as a temporary redirect (HTTP 302) to the client device 110. This can be used to direct the client device 110 to submit a new image request to a third party system such as targeted third party servers 140, 142, 144 or 146 thereby enabling the third party server to optionally read, set and/or re-set client tracking identifiers such as, but not limited to, third party cookies on the client device 110.

According to the current invention, the client device 110 can submit the additional image requests to the multibeacon management system 100, which are redirected to third party systems, in sequence or in parallel. For example, in some cases, the multibeacon instructions 102 running on the client device can include control structures which may issue the additional image requests one at a time, waiting for a timer to expire or waiting for a response to each additional image request before submitting the next one. In other cases, the additional image requests may be submitted in parallel or in rapid succession, without waiting for responses.

In a first embodiment of the current invention, multibeacon management system 100 can include modules such as an instruction server 104, a beacon provider 106, a redirection module 108, and a configuration interface 110. For example, a module such as the instruction server 104 can provide multibeacon instructions 102 to a client device 110 over a network 130 in response to a request 220 for multibeacon instructions 102. In some cases, the instruction server 104 can access information and/or the multibeacon instructions 102 from a system internal or external to the current invention. In some cases, the instruction server 104 can generate or customize multibeacon instructions 102 based on the configuration of the multibeacon management system 100. For various embodiments of the current invention, the multibeacon instructions 102 can be customized or generated based on other information such as, but not limited to, the information related to the client device 110 or information related to the content provider 122, or any combination thereof.

A module such as a beacon provider 106 can provide a beacon 250 to a client device 110 in response to an initial image request 240. In some cases, the beacon provider 106 can construct, customize or access a beacon 250 and send it to a client device 110 over a network 130 in response to an initial image request 240, causing the configuration of storage device 117 at the client device 110 for storing a digital representation 119 of the beacon 250. In some cases, the output device 118 associated with the client device 110 can present the beacon 250. The beacon 250 should be constructed or customized so that it is consistent with the multibeacon instructions 102 served by the multibeacon management system.

A module such as redirection module 108 can receive an additional image request 260 over a network 130 and redirect the additional image request 260 to a third party server 140. In some cases, the redirection module 108 can access internal and/or external databases or systems to identify and/or prioritize the appropriate third party server to use as a target for the redirection. In some cases, a module such as a redirection module 108 can keep track of redirection history per client and use this, in part, to identify and/or prioritize the appropriate third party server to use as a target for the redirection.

FIG. 3 illustrates a method flow according to an example of the current invention. An example method begins when content and directions for obtaining multibeacon instructions are provided to a client device from a networked content publisher over a network in response to a content request from the client device (Step 300). The method continues when the directions are used to retrieve multibeacon instructions over a network from a multibeacon management system and the instructions are executed at the client device, resulting in the submission of an initial image request over a network to the multibeacon management system (Step 320). The method continues when a beacon is composed and sent from the multibeacon management system to the client device in response to the initial image request causing the configuration of a storage device at the client device for storing a representation of the beacon, with the properties of the beacon configured to trigger the multibeacon instructions to instruct the client device to submit one or more additional image requests to the multibeacon management system (Step 340). Optionally, the method continues when an additional image request is received at the multibeacon management system and redirected to a third party system (Step 360).

The order of the steps in the foregoing described methods of the invention are not intended to limit the invention; the steps may be rearranged.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

APPENDIX A

<!--Start Quantcast tag-->
<script type="text/javascript" src="//secure.quantserve.com/quant.js"></script>
<script type="text/javascript">
_qacct="p-9fYuixa7g_Hm2"; quantserve( )</script>
<!--End Quantcast tag-->

APPENDIX B

<!--Start Multibeacon Instructions-->
function void_onload( ){return;}

```
function initial_onload( ) {
  var width=initial_img.width;
  for (int i=0; i<width; i++) {
    var additional_img=new Image(1,1);
    additional_img.src="http://beacon.quantserve.com/additional_pixel.gif";
    additional_img.onload=function( ) {void_onload( );}
  }
}
var initial_img=new Image;
initial_img.src="http://beacon.quantserve.com/initial_pixel.gif";
initial_img.onload=function( ) {initial_onload( );}
```

What is claimed is:

1. A method for triggering multiple client requests comprising:
   receiving at a multibeacon management system a request for multibeacon instructions from a client device, the request based on directions to contact the multibeacon management system received by the client device from a content provider;
   responsive to the request, sending multibeacon instructions from the multibeacon management system to the client device;
   receiving an initial image request at the multibeacon management system from the client device, wherein the initial image request results from execution of the multibeacon instructions by the client device; and
   responsive to the initial image request, sending a beacon from the multibeacon management system to the client device that causes a storage device at the client device to store a representation of the beacon, wherein one or more properties of the beacon are configured by the multibeacon management system to trigger the multibeacon instructions to instruct the client device to send a plurality of additional image requests to the multibeacon management system.

2. The method of claim 1 further comprising:
   receiving an additional image request at the multibeacon management system from the client device over the network.

3. The method of claim 2 further comprising:
   redirecting the additional image request by the multibeacon management system to a third party system.

4. The method of claim 3 wherein redirecting the additional image request includes instructing the client device to submit the additional image request to the third party system over the network.

5. The method of claim 3, wherein the third party system is a third party system external to the content provider and the multibeacon management system.

6. The method of claim 1 wherein configuring the beacon includes:
   identifying a number of additional image requests to configure for the beacon; and,
   configuring the one or more properties of the beacon to encode the number of additional image requests.

7. The method of claim 6 wherein identifying includes:
   identifying the number of third party systems targeted for redirection.

8. The method of claim 6 wherein identifying includes:
   identifying the number of third party systems targeted for redirection based on one or more redirection parameters.

9. The method of claim 1 wherein the one or more properties of the beacon comprise a storage size of the beacon.

10. The method of claim 1 further comprising configuring the multibeacon management system to select one or more third party systems targeted for redirection based on one or more redirection parameters.

11. A multibeacon management system comprising:
   an instruction server for providing multibeacon instructions to a client device over a network in response to a request for multibeacon instructions from the client device;
   a beacon provider for configuring and sending beacons over the network to the client device for causing a storage device at the client device to store a representation of the beacon in response to an initial image request submitted by the client device, wherein configuring the beacon includes setting one or more properties of the beacon based at least in part on the number of additional image requests to be triggered at the client device; and,
   a redirection module for managing a plurality of additional image requests generated by the client device wherein managing one additional image request includes:
      identifying a third party system targeted for redirection; and,
      redirecting the additional image request to the third party system targeted for redirection.

12. The system of claim 11 wherein redirecting comprises instructing the client device to submit the additional image request to the third party system over the network.

13. The system of claim 11 wherein the beacon provider identifies the number of additional image requests to configure for the beacon based on the number of third party servers targeted for redirection and configures the one or more properties of the beacon to encode the number of additional image requests.

14. The system of claim 11 further comprising a configuration module for configuring the third party servers targeted for redirection.

15. The system of claim 14 wherein the configuration module can be configured per client device or per group of client devices.

16. The system of claim 14 wherein the configuration module can be configured based on redirection parameters.

17. The system of claim 11 wherein the one or more properties of the beacon comprise the storage size of the beacon.

18. A non-transitory computer-readable storage medium storing executable computer program instructions for triggering multiple client requests, the computer program instructions comprising instructions for: receiving at a multibeacon management system a request for multibeacon instructions from a client device, the request based on directions to contact the multibeacon management system received by the client device from a content provider; responsive to the request, sending multibeacon instructions from the multibeacon management system to the client device; receiving an initial image request at the multibeacon management system from the client device, wherein the initial image request results from execution of the multibeacon instructions by the client device; and responsive to the initial image request, sending a beacon from the multibeacon management system to the client device-that causes a storage device at the client device to store a representation of the beacon, wherein one or more properties of the beacon are configured by the multibeacon management system to trigger the multibeacon instructions to instruct the client device to send a plurality of additional image requests to the multibeacon management system.

19. The non-transitory computer-readable medium of claim 18, wherein the computer program instructions further comprise instructions for: receiving an additional image request at the multibeacon management system from the client device over the network.

20. The non-transitory computer-readable medium of claim 19, wherein the computer program instructions further comprise instructions for: redirecting the additional image request by the multibeacon management system to a third party system.

21. The non-transitory computer-readable medium of claim 20, wherein the third party system is a third party system external to the content provider and the multibeacon management system.

\* \* \* \* \*